(12) United States Patent  
Al-Saffar (10) Patent No.: US 9,113,116 B1  
(45) Date of Patent: Aug. 18, 2015

(54) VIDEO MONITOR ATTACHMENT FOR A MICROPHONE

(71) Applicant: Anfal A. A. Al-Saffar, Mubarak Al-Kabir (KW)

(72) Inventor: Anfal A. A. Al-Saffar, Mubarak Al-Kabir (KW)

( * ) Notice: Subject to any disclaimer, the term of this patent is extended or adjusted under 35 U.S.C. 154(b) by 0 days.

(21) Appl. No.: 14/547,117

(22) Filed: Nov. 18, 2014

(51) Int. Cl.
| | |
|---|---|
| H04R 9/08 | (2006.01) |
| H04R 11/04 | (2006.01) |
| H04R 17/02 | (2006.01) |
| H04R 19/04 | (2006.01) |
| H04R 21/02 | (2006.01) |
| H04N 5/645 | (2006.01) |
| H04R 1/02 | (2006.01) |

(52) U.S. Cl.
CPC .............. *H04N 5/645* (2013.01); *H04R 1/028* (2013.01)

(58) Field of Classification Search
CPC ................................... H04R 1/04; H04R 1/02
USPC ......................................... 381/361, 366, 122
See application file for complete search history.

(56) References Cited

U.S. PATENT DOCUMENTS

| | | | | |
|---|---|---|---|---|
| 4,577,070 | A * | 3/1986 | Shulman ........................ | 381/366 |
| 8,218,809 | B2 | 7/2012 | Wilson | |
| 8,529,106 | B2 * | 9/2013 | Jung et al. ..................... | 362/388 |
| 2008/0099656 | A1 * | 5/2008 | Liou et al. ..................... | 248/688 |
| 2008/0205684 | A1 * | 8/2008 | Wilson .......................... | 381/388 |
| 2011/0054922 | A1 * | 3/2011 | Gaines et al. ................. | 705/1.1 |
| 2013/0308796 | A1 | 11/2013 | Levinsohn | |

FOREIGN PATENT DOCUMENTS

| | | | |
|---|---|---|---|
| DE | 10 2011 014 489 A1 | | 9/2012 |
| GB | 2439405 A | * | 12/2007 |
| JP | 07-107581 A | | 4/1995 |
| WO | WO 2011057271 A1 | * | 5/2011 |

OTHER PUBLICATIONS

"Video Mic Flag," http://videobadges.com/video_mic_flag.htm. (1 page) (Last Accessed on Jul. 21, 2014).
"Video Mic Flag," http://www.recomgroup.com/Video%20Mic%20Flag.pdf (1 page) (Last Accessed on Jul. 21, 2014).

* cited by examiner

*Primary Examiner* — Alexander Jamal
(74) *Attorney, Agent, or Firm* — Richard C. Litman (57) ABSTRACT

A video monitor attachment for microphones, the video monitor attachment having a top portion having a first opening, a bottom portion having a second opening, and a plurality of sides, the first opening and the second opening communicating with a channel adapted to receive a handle of the microphone, at least one selectively moveable monitor pivotally mounted on a coupling member positioned on the video monitor attachment, and a plurality of self-adjusting gripping assemblies. Each self-adjusting gripping assembly can include at least one biasing member and a gripping member coupled to at least one biasing member, the plurality of self-adjusting gripping assemblies adapted to secure a handle of the microphone. The at least one selectively moveable monitor can be coupled to a selectively moveable first monitor. The coupling member can include a hinge or a ball joint on which to pivotally mount the at least one selectively moveable monitor.

20 Claims, 12 Drawing Sheets

VIDEO MONITOR ATTACHMENT FOR A MICROPHONE

BACKGROUND OF THE INVENTION

1. Field of the Invention

The present invention relates generally to audio/visual equipment and, more specifically to a video monitor attachment for microphones.

2. Description of the Related Art

These days many companies are careful about how their advertising budget is spent. They want to ensure that their advertising reaches the greatest number of people for the lowest possible cost. One manner of advertising in which this goal can be achieved involves displaying a company's brand or logo on a microphone being used to announce a basketball game or conduct an interview of a high profile person, for example.

By displaying a company's logo or brand on the microphone being used by an announcer or a news correspondent, the company is able to display its brand or logo in front of an audience for the length of the program or interview and, typically, without it being obstructed. This can allow a company to get a relatively increased exposure for relatively little cost, as compared with other forms of advertising, such as commercials that typically only last for approximately 30 seconds to two minutes, and typically cost significantly more.

Using microphones as a form of advertising typically involves using attachments, bearing the company's logo. Such attachments, however, can have certain drawbacks. For example, the attachments in use today typically can only be used with microphones having a handle of a certain width and generally only have a certain number of locations on which to display the company's logo. A further drawback is that the company's logo is typically fixed in one place on the attachment causing the logo to become obstructed if the announcer or news correspondent shifts direction without first advising the camera person.

Thus, a video monitor attachment for microphones addressing the aforementioned problems is desired.

SUMMARY OF THE INVENTION

Embodiments of a video monitor attachment for a microphone include a top portion including a first opening, a bottom portion including a second opening, and a plurality of sides in communication with the top portion and the bottom portion, the first opening and the second opening communicating with a channel formed within the video monitor attachment adapted to receive a handle of the microphone. The video monitor attachment also includes at least one and, desirably, a plurality of selectively moveable monitors, each selectively moveable monitor being movably, such as pivotally, mounted on a coupling member positioned on the video monitor attachment, such as on an outer wall of a side of the video monitor attachment, for example, and a plurality of self-adjusting gripping assemblies located in an interior portion of the video monitor attachment in communicating relation with the channel.

Each self-adjusting gripping assembly has at least one and, desirably, a plurality of biasing members having a first end coupled to a gripping member and a second end coupled to an interior wall of a corresponding side of the video monitor attachment, the self-adjusting gripping assembly adapted to engage the handle of the microphone when the handle of the microphone is inserted through the first opening, the channel and the second opening so as to position the handle in engaging relation with the video monitor attachment. It is to be noted that the video monitor attachment can be adapted to include a coupling member, such as a hinge, to allow the at least one selectively moveable monitor to move about at least one axis. The video monitor attachment can also be configured to include a coupling member, such as a ball joint or other swivel arrangement, to allow the at least one selectively moveable monitor to move about at least two axes.

Further embodiments of a video monitor attachment for a microphone include a top portion including a first opening, a bottom portion including a second opening, and a plurality of sides communicating with the top portion and the bottom portion, the first opening and the second opening communicating with a channel formed within the video monitor attachment adapted to receive the handle of the microphone, The video monitor attachment also includes at least one and, desirably, a plurality of selectively moveable monitors, each selectively moveable monitor being movably, such as pivotally, mounted on a coupling member positioned on the video monitor attachment, such as on an outer wall of a corresponding side of the video monitor attachment, for example. The video monitor attachment also includes at least one selectively moveable monitor coupled to a corresponding selectively moveable first monitor, and includes a plurality of self-adjusting gripping assemblies located in an interior portion of the video monitor attachment in communicating relation with the channel.

Each self-adjusting gripping assembly has at least one and, desirably, a plurality of biasing members having a first end coupled to a gripping member and a second end coupled to corresponding interior wall of a side of the video monitor attachment, each self-adjusting gripping assembly being adapted to engage the handle of the microphone when the handle of the microphone is inserted through the first opening, the channel and the second opening so as to position the handle in engaging relation with the video monitor attachment. It is to be noted that the video monitor attachment can be adapted to include a coupling member, such as a hinge, to allow the at least one selectively moveable monitor or the selectively moveable first monitor to move about at least one axis. The video monitor attachment can also be configured to include a coupling member, such as a ball joint or other swivel arrangement, to allow the at least one selectively moveable monitor or the selectively moveable first monitor to move about at least two axes.

These and other features of the present invention will become readily apparent upon further review of the following specification and drawings.

BRIEF DESCRIPTION OF THE DRAWINGS

Unless otherwise indicated, similar reference characters denote corresponding features consistently throughout the attached drawings.

DETAILED DESCRIPTION OF THE PREFERRED EMBODIMENTS

Referring to FIGS. 1A-4B, an embodiment of a video monitor attachment, such as a video monitor attachment 10, for a microphone 20 having a handle 30 and a head 40 is illustrated. The microphone, such as the microphone 20, can include any of various known microphones having a head and a handle and should not be construed in a limiting sense. It is to be noted that the video monitor attachment 10 can be formed in any of various suitable shapes or configurations, such as a generally cube shape or configuration of an embodiment of the video monitor attachment 10, and a generally triangular prism shape or configuration of an embodiment of a video monitor attachment 10a (FIGS. 3A, 3B, and 3C), or can be of other of various suitable shapes or configurations, as can depend on the use or application, and should not be construed in a liming sense. The video monitor attachment, such as the video monitor attachment 10 and the video monitor attachment 10a, include a top portion 50, 50a having a first opening 55, 55a a bottom portion 60, 60a having a second opening 65, 65a and a plurality of sides 70, 70a communicating with the top portion 50, 50a and the bottom portion 60, 60a and having an inner wall 125, 125a and an outer wall 132, 132a. The first opening 55, 55a and the second opening 65, 65a are configured to communicate with a channel 80, 80a (FIGS. 2B and 3B) adapted to receive the handle 30 of the microphone 20.

The video monitor attachment, such as the video monitor attachment 10 and the video monitor attachment 10a, also includes at least one and, desirably, a plurality of selectively moveable monitors 90, each selectively moveable monitor 90 being movably, such as pivotally, mounted on a coupling member 130 positioned on the video monitor attachment, such as the video monitor attachment 10 and the video monitor attachment 10a, such as on the outer wall 132, 132a of a side 70, 70a of the video monitor attachment, such as the video monitor attachment 10 and the video monitor attachment 10a, for example. It is to be noted that the coupling member 130 can include a hinge, a ball joint or other swivel type arrangement, on which to pivotally mount the at least one selectively moveable monitor 90. Since the at least one selectively moveable monitor 90, such as can be any of various suitable video monitors, having a display screen 90a, such as a flat panel type display screen, for example, is movably, such as pivotally, mounted on the video monitor attachment, such as the video monitor attachment 10 and the video monitor attachment 10a. Where the coupling member 130 includes a hinge, such as a circular type hinge, for example, the at least one selectively moveable monitor 90 can rotate about at least one axis and, where the coupling member 130 includes a ball joint or a swivel type arrangement, for example, the at least one selectively moveable monitor 90 can rotate about at least two axes.

Figure 1A:
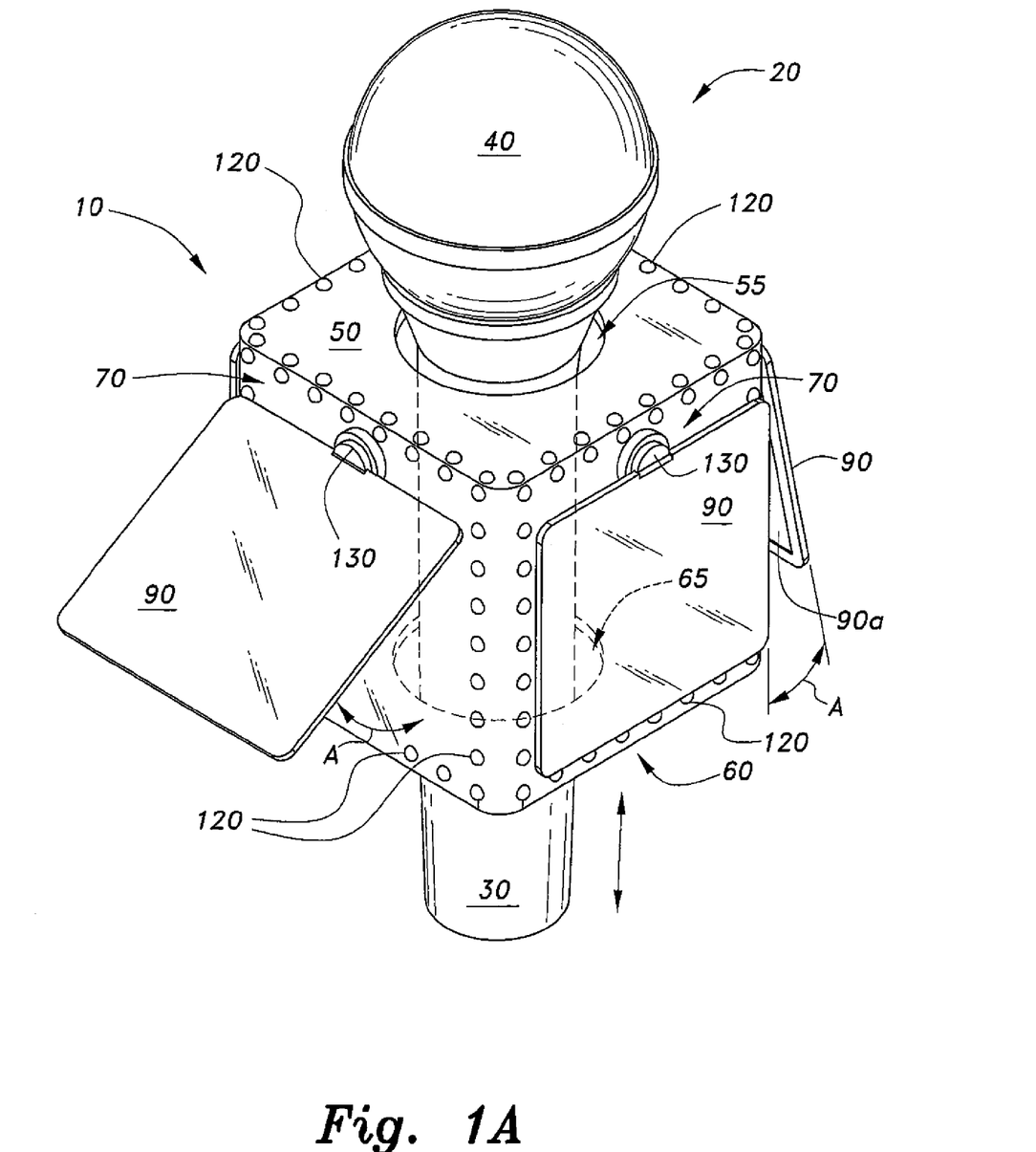
FIG. 1A is an environmental view of a microphone having an embodiment of a video monitor attachment according to the present invention.
Figure 1B:
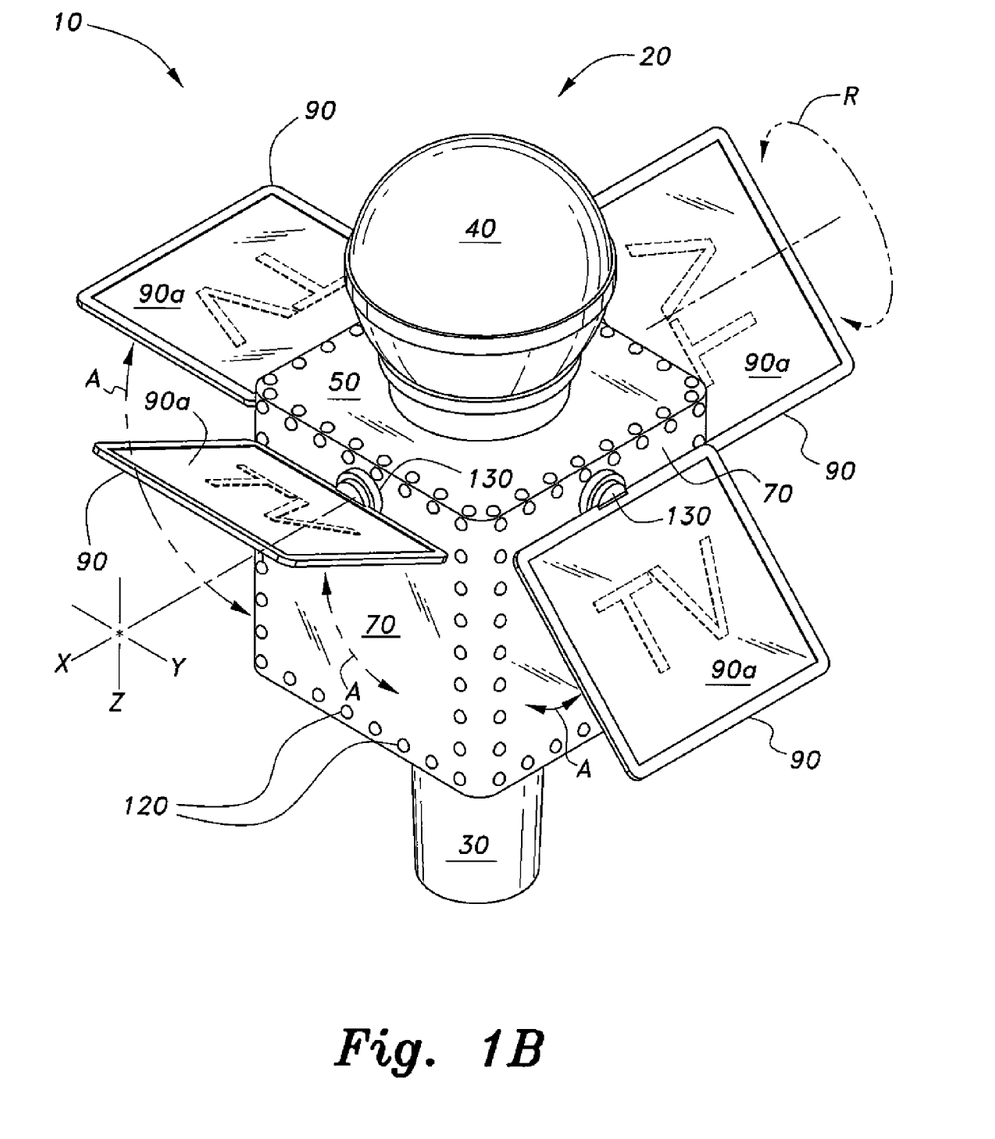
FIG. 1B is a side, perspective view of a microphone having an embodiment of a video monitor attachment including a plurality of selectively moveable monitors according to the present invention.

In this regard, it is to be noted that when the least one selectively moveable monitor 90 is associated with a coupling member 130, such as including a ball joint or swivel type arrangement, for example, such coupling member 130 can enable the corresponding display screen 90a to be rotated at angle R about at least a first axis, such as about the X axis in FIG. 1B and to be rotated at an angle A formed between a selectively movable monitor 90 and a corresponding side 70, 70a, about at least a second axis, such as about the Z axis in FIG. 1B. Such rotation about at least one axis or about at least two axes can enable the at least one selectively movable monitor 90 to be selectively adjusted to various suitable angles and various suitable positions, such as in relation to the X, Y and Z axes, so that the display screen 90a can face and be positioned in various directions and positions, such as in various outward directions and positions, to display media thereon, such as while the microphone 20 is being used or positioned within the video monitor attachment, such as the video monitor attachment 10 and the video monitor attachment 10a, for example. It is to be noted that the display screen 90a of the at least one selectively moveable monitor 90 can face in various inward directions and positions, as well, so as can assist in protecting the display screen 90a from damage.

Figure 5A:
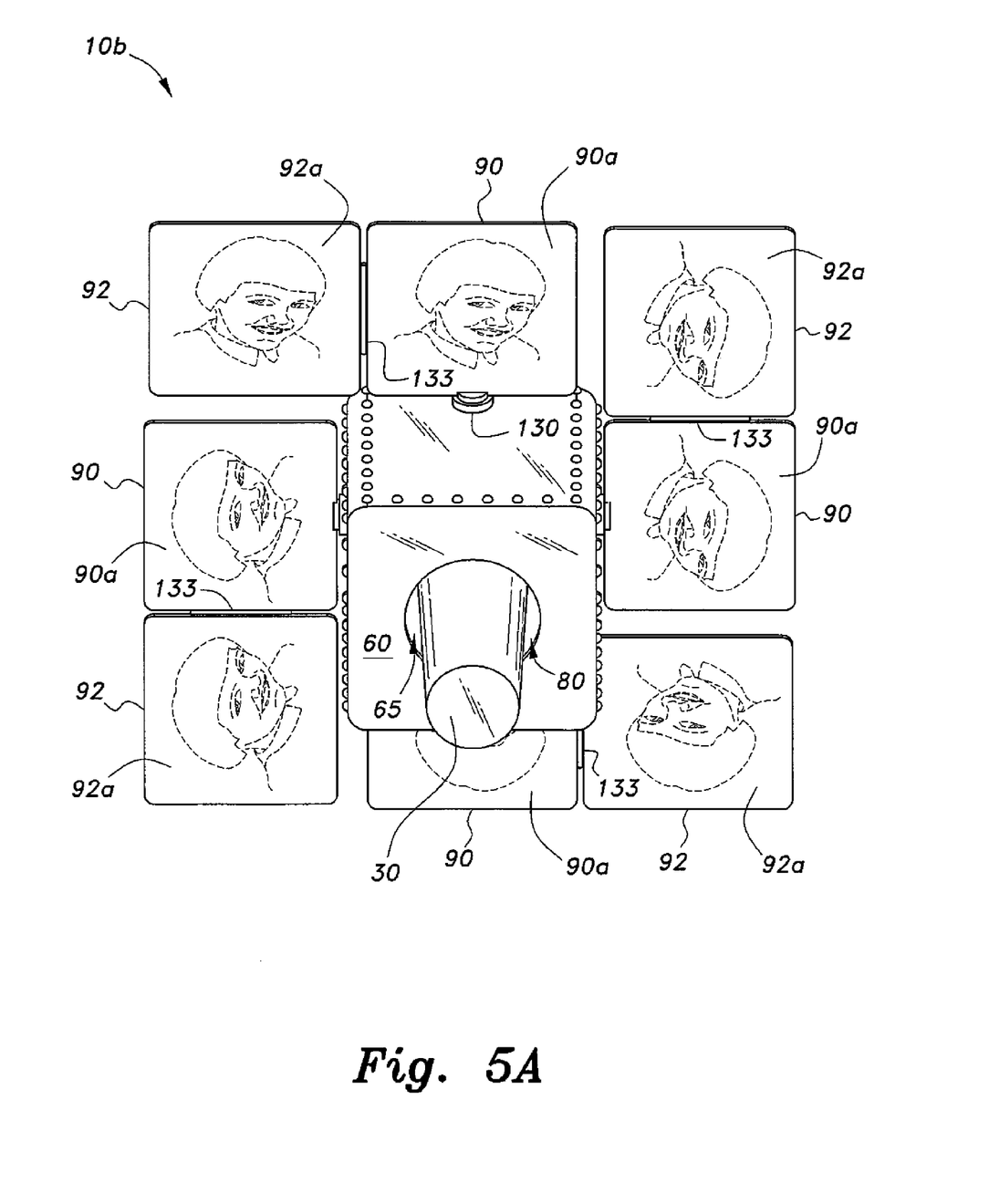
FIG. 5A is bottom, perspective view of a microphone having another embodiment of a video monitor attachment including at least one selectively moveable monitor coupled to a corresponding selectively moveable first monitor according to the present invention.
Figure 5B:
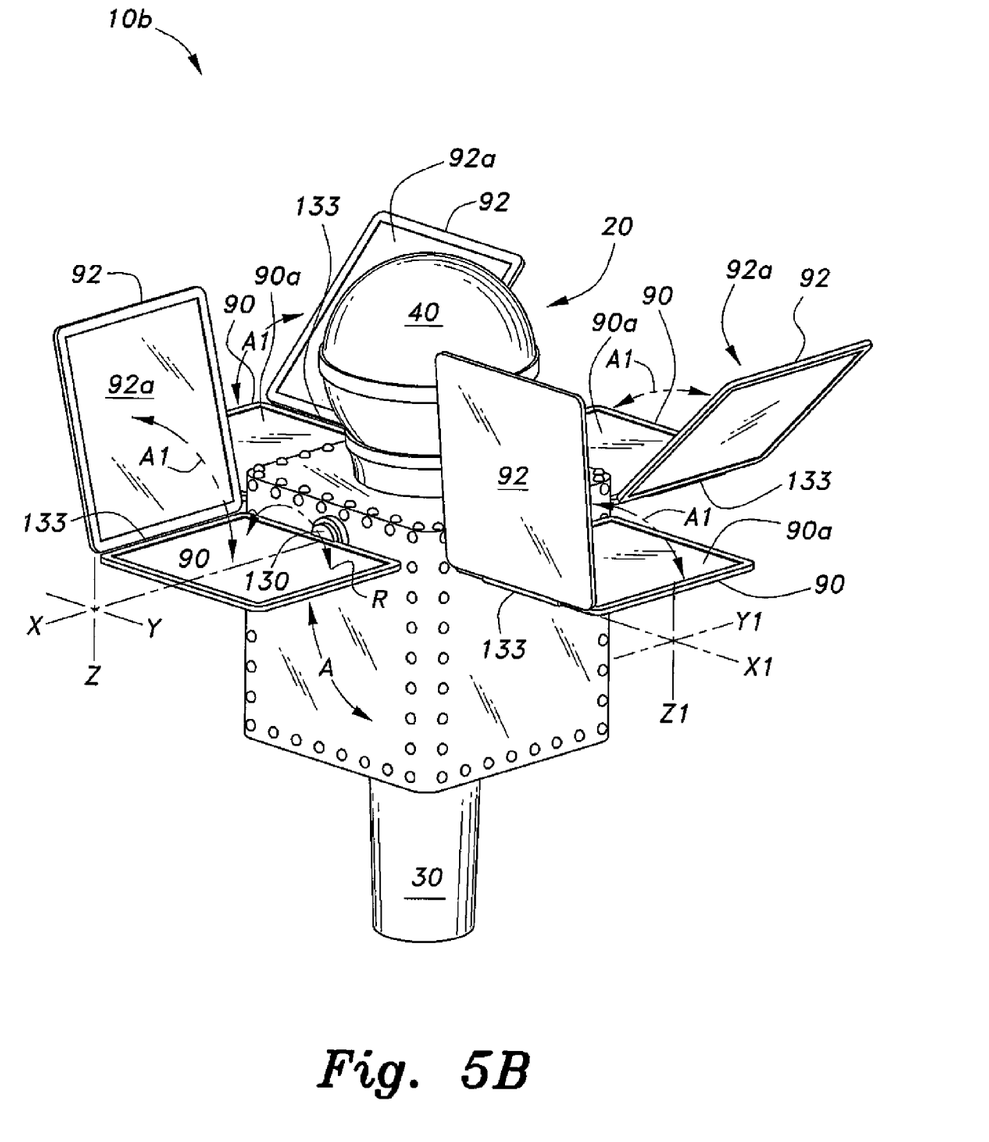
FIG. 5B is side view of a microphone having another embodiment of a video monitor attachment including at least one selectively moveable monitor coupled to a corresponding selectively moveable first monitor according to the present invention.

Referring to FIGS. 5A and 5B, another embodiment of a video monitor attachment 10b is illustrated. The video monitor attachment 10b is substantially similar in configuration to the embodiment of the video monitor attachment 10 and operates in a substantially similar fashion to the embodiments of the video monitor attachment 10 and the video monitor attachment 10a described in relation to FIGS. 1A-4B. A difference between the embodiment of the video monitor attachment 10b and the embodiments of the video monitor attachment 10 and the video monitor attachment 10a, described herein, is that the embodiment of the video monitor attachment 10b, in addition to including at least one and, desirably, a plurality of selectively moveable monitors 90 movably, such as pivotally, mounted onto the video monitor attachment 10b, also includes at least one and, desirably, a plurality of selectively moveable first monitors 92, such as can be any of various suitable video monitors, having a display screen 92a, such as a flat panel type display screen, for example. Each selectively moveable first monitor 92 is associated with a corresponding selectively moveable monitor 90, such as illustrated in FIGS. 5A and 5B, for example.

In embodiments of the video monitor attachment 10b, at least one selectively moveable monitor 90 and, desirably, each or a plurality of selectively moveable monitors 90 are coupled to a corresponding selectively moveable first monitor 92 adapted to display media while the microphone 20 is being used or is positioned in the video monitor attachment 10b, for example. It is to be noted that the at least one selectively moveable monitor 90 and the corresponding selectively moveable first monitor 92 can be coupled to one another through a second coupling member 133 as can include various suitable types of pivoting or coupling mechanisms, such as a ball joint or other swivel joint arrangement, a circular hinge or other suitable hinge arrangement, that can allow the selectively moveable first monitor 92 to selectively open from a closed position adjacent to a corresponding selectively moveable monitor 90 to a plurality of various open positions, such as indicated by the angle A1 in FIG. 5B, for example, and such range of positions can be further increased in relation to the X1, Y1 and Z1 axes by movement of the coupling arrangement 130 associated with a corresponding selectively moveable monitor 90, for example.

Where the coupling member 130 and/or the second coupling member 133 includes a hinge, such as a hinge or a circular type hinge, for example, the at least one selectively moveable monitor 90 and/or the at least one selectively movable first monitor 92 can rotate about at least one axis. Where the coupling member 130 and/or the second coupling member 133 includes a ball joint or a swivel type arrangement, for example, the at least one selectively moveable monitor 90 and/or the at least one selectively movable first monitor 92 can rotate about at least two axes, for example.

In this regard, it is to be noted that when the least one selectively moveable monitor 90 is associated with a coupling member 130 including a ball joint or swivel type arrangement, such coupling member 130 can enable the corresponding display screen 90a to be rotated at angle R about at least a first axis, such as about at least the X axis in FIG. 5B and to be rotated at an angle A formed between a selectively movable monitor 90 and a corresponding side 70, 70a, about at least a second axis, such as about at least the Z axis in FIG. 5B. Also, it is to be noted that when the at least one selectively moveable first monitor 92 is associated with a coupling member 133 including a ball joint or swivel type arrangement, such coupling member 133 can enable the at least one selectively moveable first monitor 92 and the corresponding display screen 92a to be rotated at an angle A1, formed between a corresponding selectively movable monitor 90 and the corresponding selectively moveable first monitor 92, about at least a first axis, such as about at least the X1 axis in FIG. 5B and to be rotated about at least a second axis, such as about at least the Z1 axis in FIG. 5B, for example.

Such rotation about at least one axis or about at least two axes can enable the at least one selectively movable monitor 90 and/or the corresponding selectively movable first monitor 92 to be selectively adjusted to various suitable angles and various suitable positions, such as in relation to the respective X, Y and Z axes or the X1, Y1 and Z1 axes, so that the display screen 90a and/or the corresponding display screen 92a can face and be positioned in various directions and positions, such as in various outward and inward directions and positions, to display media thereon, such as while the microphone 20 is being used or is positioned within the video monitor attachment, such as the video monitor attachment 10b, for example. It is to be noted that the display screen 90a of a corresponding selectively movable monitor 90 and the display screen 92a of a corresponding selectively moveable first monitor 92 can face in various inward directions and positions, as well, so as can assist in protecting the display screen 90a and the display screen 92a from damage, for example.

Referring to FIGS. 2A, 2B, 3A, 4A and 4B, the video monitor attachment, such as the video monitor attachments 10, 10a, and 10b, also can include a plurality of self-adjusting gripping assemblies 95 located in an interior portion 110, 110a of the video monitor attachment, such as the video monitor attachments 10, 10a, and 10b. Each self-adjusting gripping assembly 95 has at least one and, desirably, a plurality of biasing members 100. Each biasing member 100 has a first end 117 coupled to a corresponding gripping member 105 and a second end 119 coupled to corresponding inner wall 125, 125a of a corresponding side 70, 70a of the video monitor attachment, such as the video monitor attachments 10, 10a, and 10b. It is to be understood that the interior portion 110, 110a of the video monitor attachment, such as the video monitor attachments 10, 10a, and 10b, can be partially covered, such as by an inner cylindrical wall, to assist in preventing foreign objects from entering the video monitor attachment, such as the video monitor attachments 10, 10a, and 10b.

It is to be understood that each gripping member 105 can include a friction enhancing material 107, such as a rubberized layer, to assist in securing each gripping member 105 of the video monitor attachment, such as the video monitor attachments 10, 10a, and 10b, to the handle 30 of the microphone 20. Also, the gripping member 105 of a corresponding self-adjusting gripping assembly 95 can be oriented either horizontally or vertically within the interior portion 110, 110a of the video monitor attachment, such as the video monitor attachments 10, 10a, and 10b, as can depend on the use or application, and should not be construed in a limiting sense.

Figure 4A:
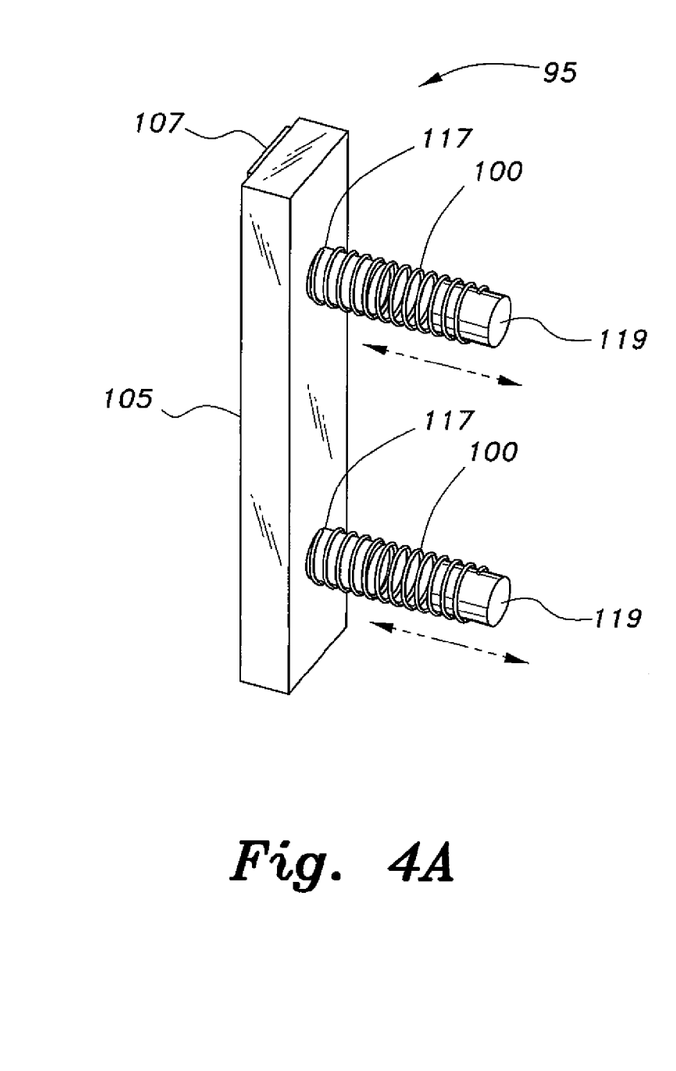
FIG. 4A is a front, side view of an embodiment of a self-adjusting gripping assembly including a single gripping member for embodiments of a video monitor attachment for a microphone according to the present invention.
Figure 4B:
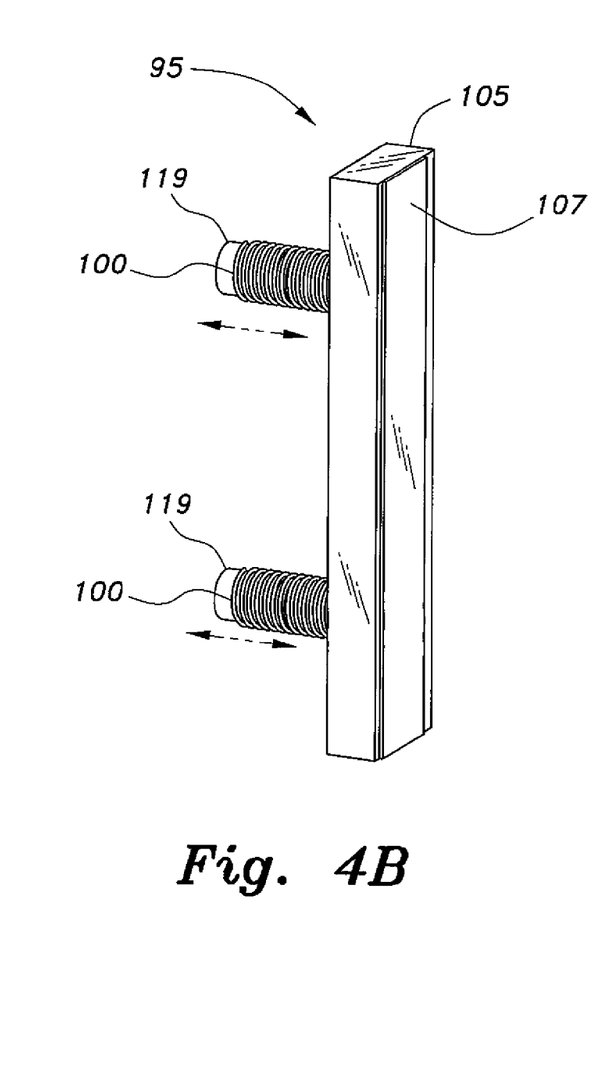
FIG. 4B is a back, side view of an embodiment of the self-adjusting gripping assembly including a single gripping member for embodiments of a video monitor attachment for a microphone according to the present invention.
Figure 4C:
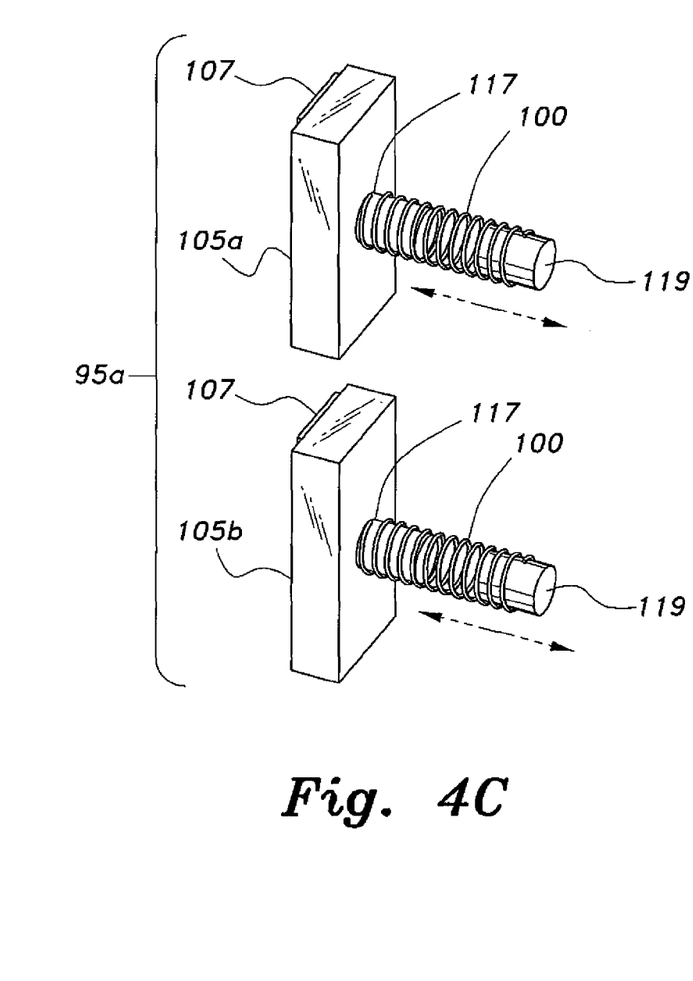
FIG. 4C is a front, side view of another embodiment of a self-adjusting gripping assembly including a plurality of individual gripping members forming the self-adjusting gripping assembly for embodiments of a video monitor attachment for a microphone according to the present invention.
Figure 4D:
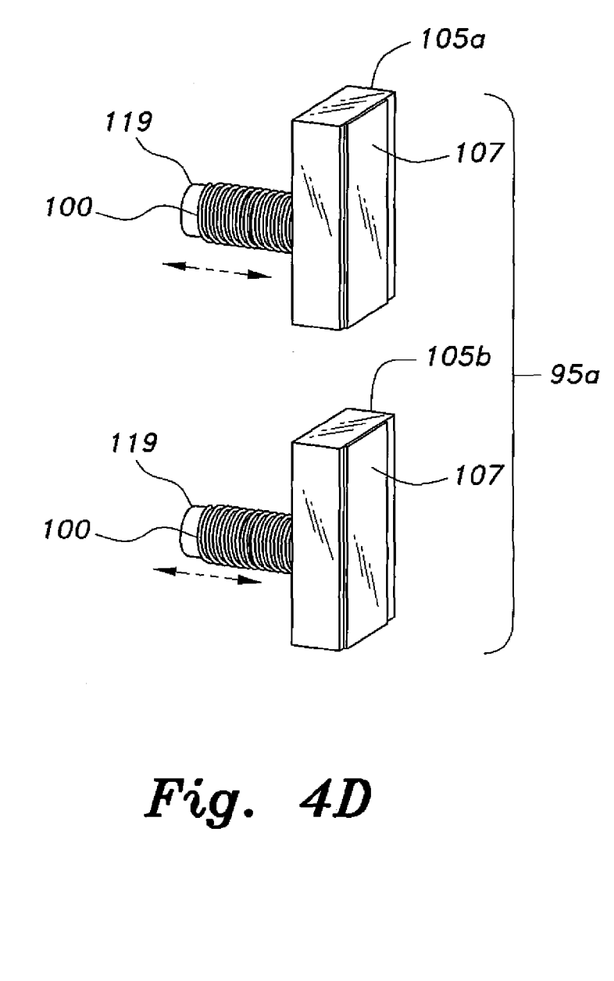
FIG. 4D is a back, side view of a self-adjusting gripping assembly including a plurality of individual gripping members forming the self-adjusting gripping assembly for embodiments of a video monitor attachment for a microphone according to the present invention.

Referring also to FIGS. 4C and 4D, another embodiment of a self-adjusting gripping assembly 95a including a plurality of individual gripping members 105a and 105b forming the self-adjusting gripping assembly 95a for embodiments of a video monitor attachment, such as for video monitor attachments 10, 10a and 10b, is illustrated. In this regard, it is to be understood that the gripping member 105 is not limited to be formed of a single gripping member 105, but can include a plurality of individual gripping members, such as gripping members 105a and 105b, arranged in an aligned relation with respect to each other. Similarly, in the self-adjusting gripping assembly 95a, each biasing member 100 has a first end 117 coupled to a corresponding gripping member 105a, 105b and a second end 119 coupled to corresponding inner wall 125, 125a of a corresponding side 70, 70a of the video monitor attachment, such as the video monitor attachments 10, 10a, and 10b.

The plurality of gripping members forming the self-adjusting gripping assembly 95a, such as gripping members 105a and 105b, assist in securing each gripping member 105a, 105b of the video monitor attachment, such as the video monitor attachments 10, 10a, and 10b, to the handle 30 of the microphone 20. Also, similarly, the gripping members 105a, 105b of a corresponding self-adjusting gripping assembly 95a can be oriented either horizontally or vertically within the interior portion 110, 110a of the video monitor attachment, such as the video monitor attachments 10, 10a, and 10b, as can depend on the use or application, and should not be construed in a limiting sense. It is to be understood that each gripping member 105a, 105b can include a friction enhancing material 107, such as a rubberized layer, to assist in securing each gripping member 105a, 105b of the video monitor attachment, such as the video monitor attachments 10, 10a, and 10b, to the handle 30 of the microphone 20.

The self-adjusting gripping assemblies 95, 95a can be adapted to engage a microphone handle 30 having a variety of different diameters or different shapes, and the video monitor attachment, such as the video monitor attachments 10, 10a, and 10b, is adapted to be positioned in engaging relation with the handle 30, such as at a position adjacent to the head 40 of the microphone 20, for example.

Referring to FIGS. 1A, 1B, 2A, 2B, 3A, 3B, 3C, 5A and 5B, the video monitor attachment, such as the video monitor attachments 10, 10a, and 10b, can be made from any suitable material or various suitable materials, or combinations thereof, such as wood, plastic or metal, for example. It is to be noted that the first opening 55, 55a in the top portion 50, 50a of the video monitor attachment, such as the video monitor attachments 10, 10a, and 10b, and the second opening 65, 65a in the bottom portion 60, 60a of the video monitor attachment, such as the video monitor attachments 10, 10a, and 10b, can be of any of various suitable shapes and configurations, such as a circle, for example, that can receive a microphone handle 30 having any of various different diameters, shapes and configurations, and should not be construed in a limiting sense.

It is to be noted that a size of the first opening 55, 55a and a size of the second opening 65, 65a can correspond to a maximum diameter or dimension of the microphone handle 30 that can be used in conjunction with the video monitor attachment, such as the video monitor attachments 10, 10a, and 10b. Further, it is to be understood that the size of the first opening 55, 55a can be greater than the size of the second opening 65, 65a, for example, and the respective sizes of the first opening 55, 55a and the second opening 65, 65a should not be construed in a limiting sense.

Each of the plurality of sides 70, 70a of the video monitor attachment, such as the video monitor attachments 10, 10a, and 10b, can have any of various suitable dimensions, such as 4 inches in length L by 3 inches in height H. It is to be noted that the video monitor attachment, such as the video monitor attachments 10, 10a, and 10b, can be configured to include uniquely identifiable or distinctive indicia, such as a color, such as black, red, or blue, or a logo reflecting a company's brand or other organization's affiliation, for example.

The video monitor attachment, such as the video monitor attachments 10, 10a, and 10b, can also be configured to include at least one and, desirably, a plurality of decorative elements 120, such as precious stones or lights, for example, which can assist in attracting the attention of the audience. Further, the at least one selectively moveable monitor 90 and the at least one selectively moveable first monitor 92 can be of any of various suitable sizes or of any of various suitable configurations, such as 3.75 inches in length or width, and the respective display screens 90a and 92a, can be of any of various suitable sizes or of any of various suitable configurations, such as 2.8 inches in length or width, for example, as can depend on the use or application, that can display images, such as media images as can include a video, a company logo, etc., or can display other images, as can include information, to an audience, for example.

Referring to FIGS. 2A, 2B, 3A, 4A, 4B, 4C and 4D, each biasing member 100 can be adapted for one or more of selective linear and nonlinear movement to selectively adjust for the shape and thickness of the handle 30 of the microphone 20 being used in conjunction with the video monitor attachment, such as the video monitor attachments 10, 10a, and 10b. It is to be appreciated that each biasing member 100 can be formed from various suitable materials that are compressible, flexible, and resilient in nature, such as polymeric or metallic compressible springs, for example, as can be made of any of various suitable materials, such as plastic or metal, that can be adapted to compress when pressure is exerted on the biasing member 100 and expand when the pressure is relieved from the biasing member 100, for example, as can depend on the use or application, and should not be construed in a limiting sense. Further, the griping members 105, 105a, 105b respectively coupled to at least one biasing member 100 can be made of any of various suitable materials, such as a plastic material, and can have any of various suitable sizes, such as between 0.5 inches to 1.5 inches in length, for example, as can depend on the thickness of the handle 30 of the microphone 20, for example.

Figure 2A:
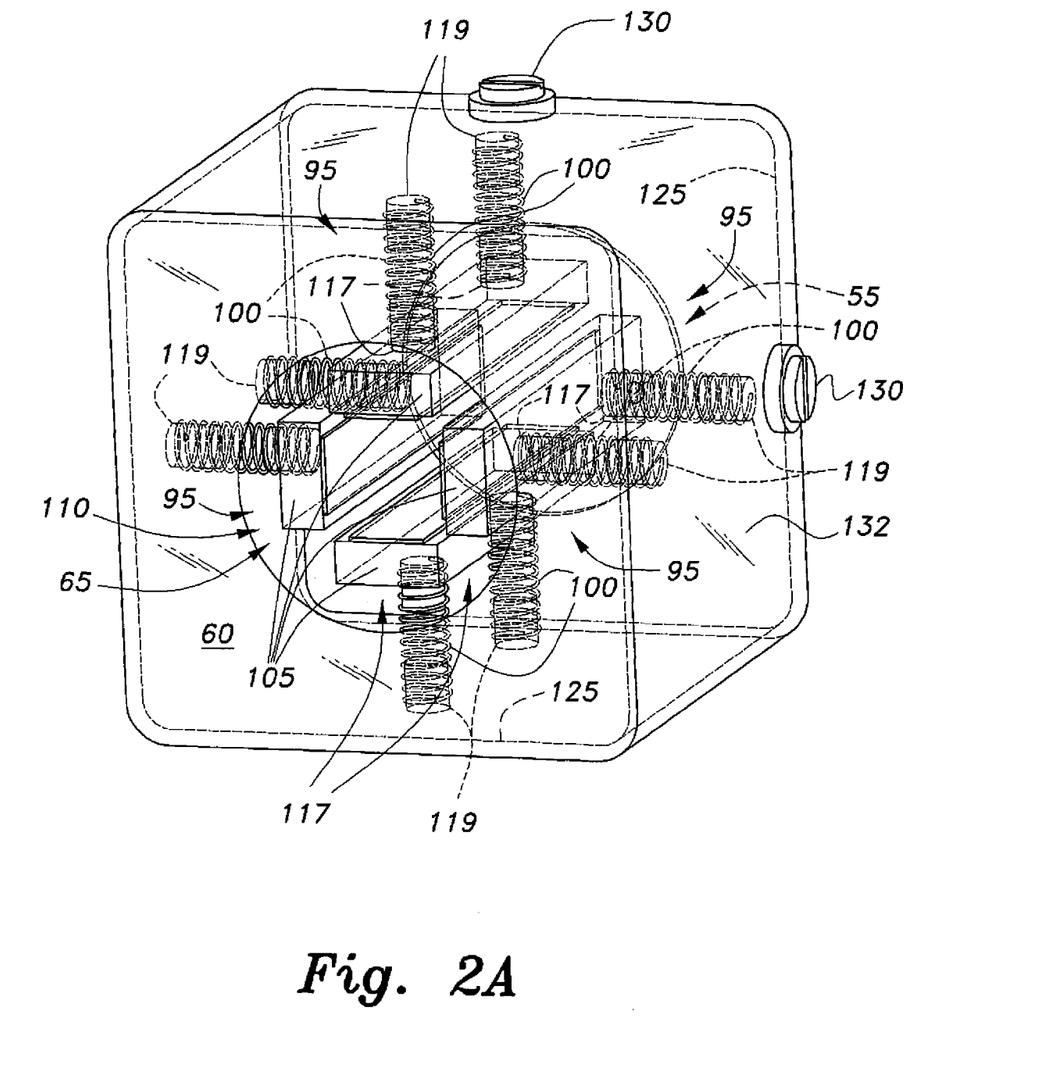
FIG. 2A is a perspective, bottom schematic view of an interior portion of an embodiment of a video monitor attachment having a plurality of self-adjusting gripping assemblies according to the present invention. The at least one selectively moveable monitor has been removed for clarity.
Figure 2B:
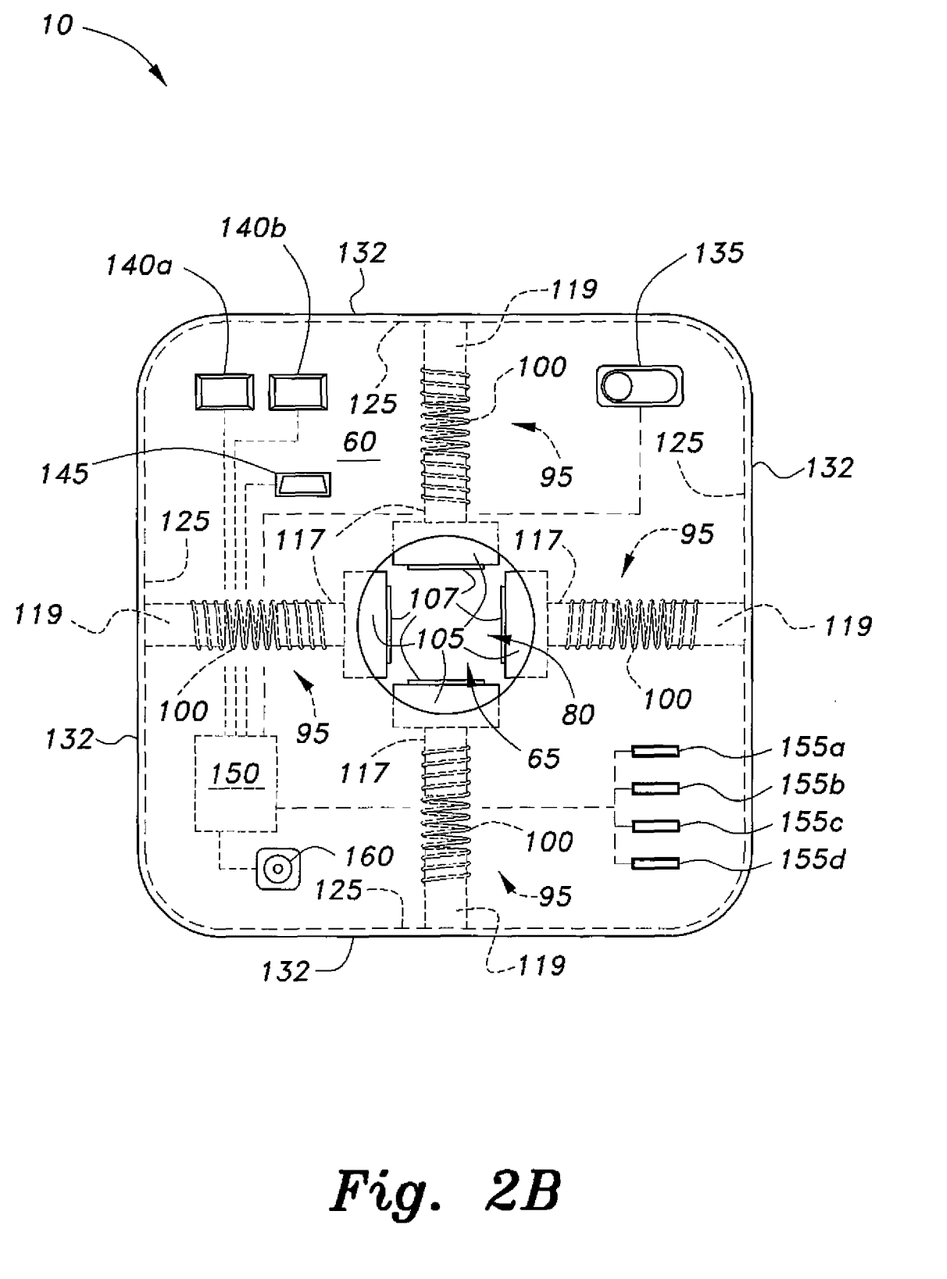
FIG. 2B is a bottom, schematic view of an embodiment of a video monitor attachment for a microphone having a plurality of self-adjusting gripping assemblies according to the present invention.
Figure 3A:
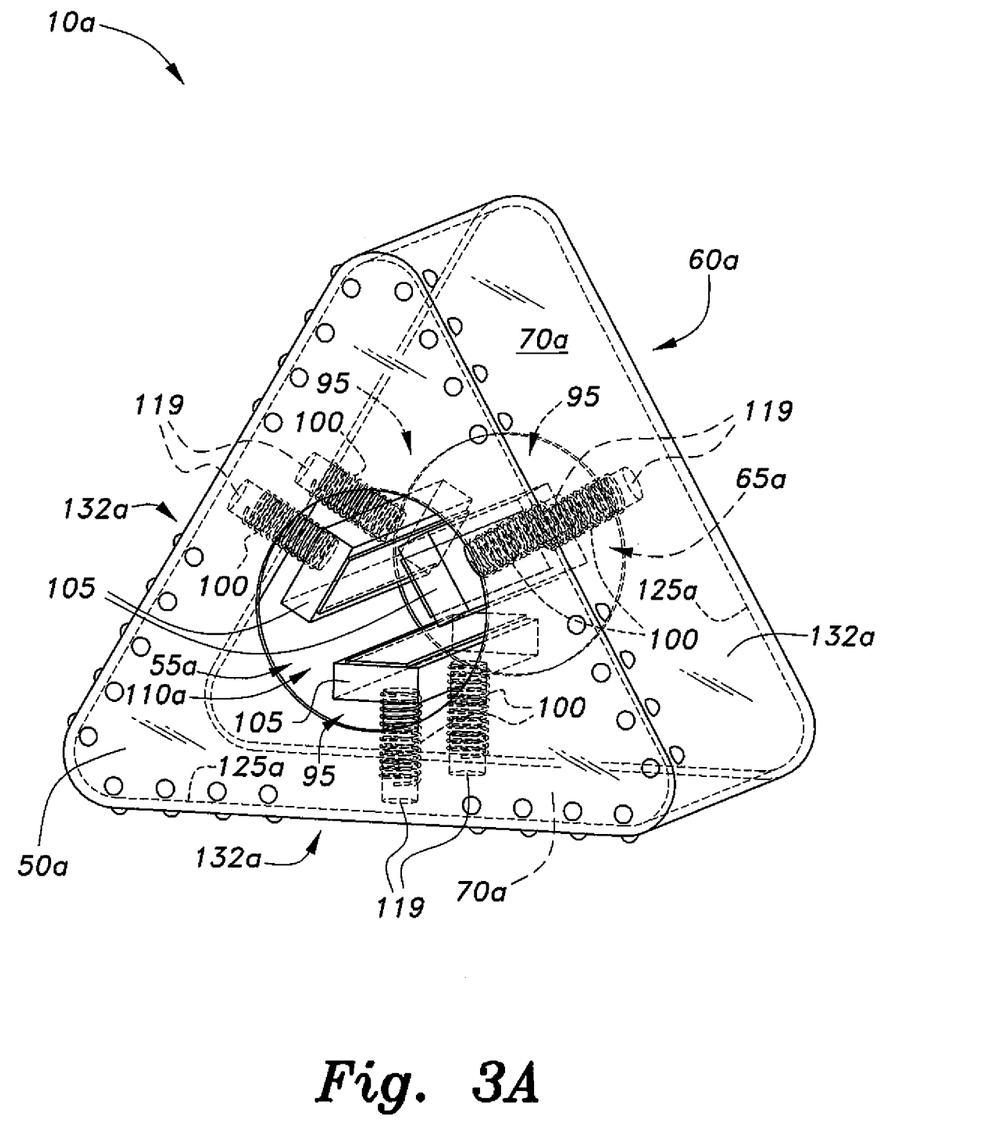
FIG. 3A is a front, top schematic view of an interior portion of another embodiment of a video monitor attachment for a microphone having a plurality of self-adjusting gripping assemblies according to the present invention. The coupling members and the corresponding at least one selectively moveable monitor have been removed for clarity.
Figure 3B:
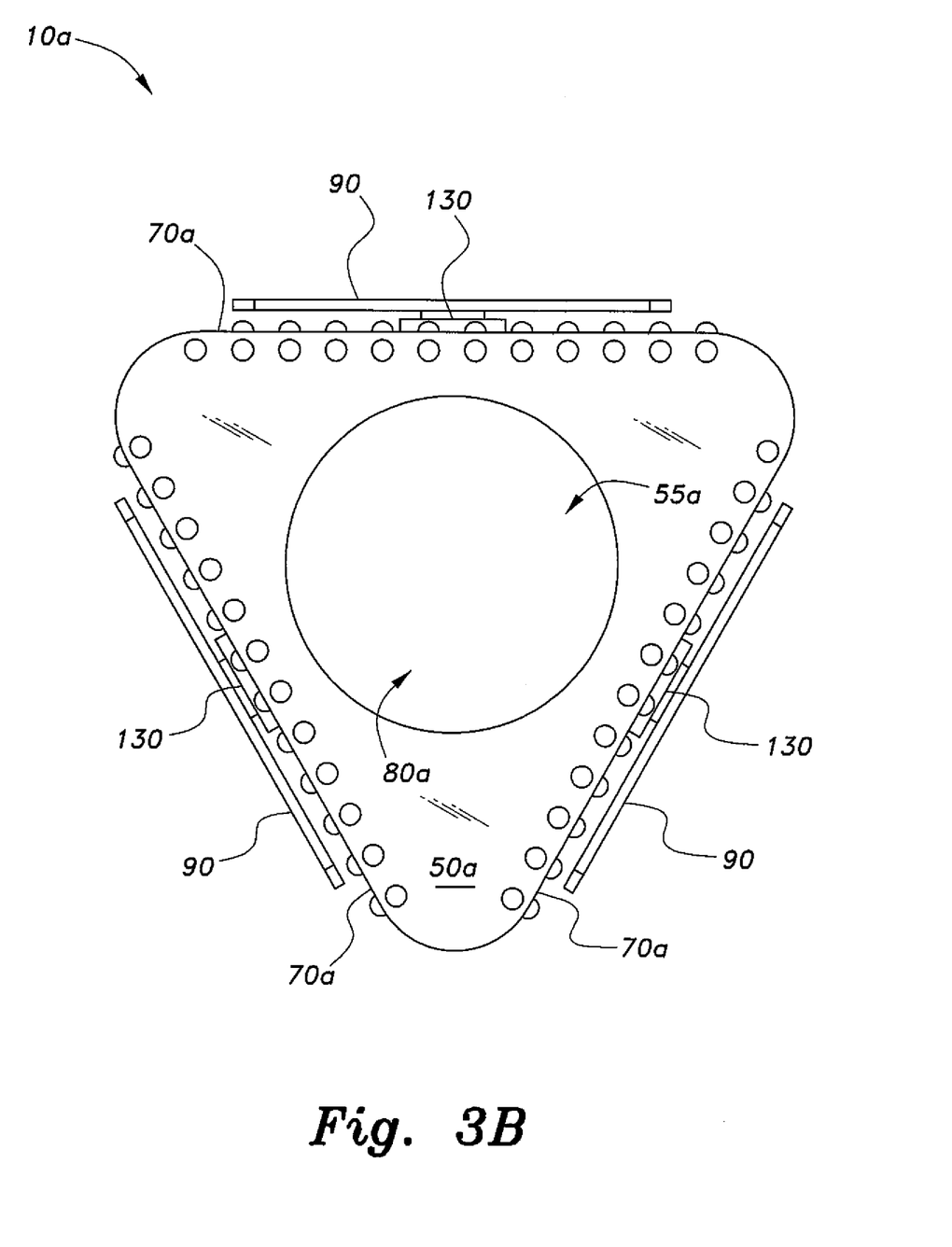
FIG. 3B is a top view of another embodiment of a video monitor attachment for a microphone according to the present invention.
Figure 3C:
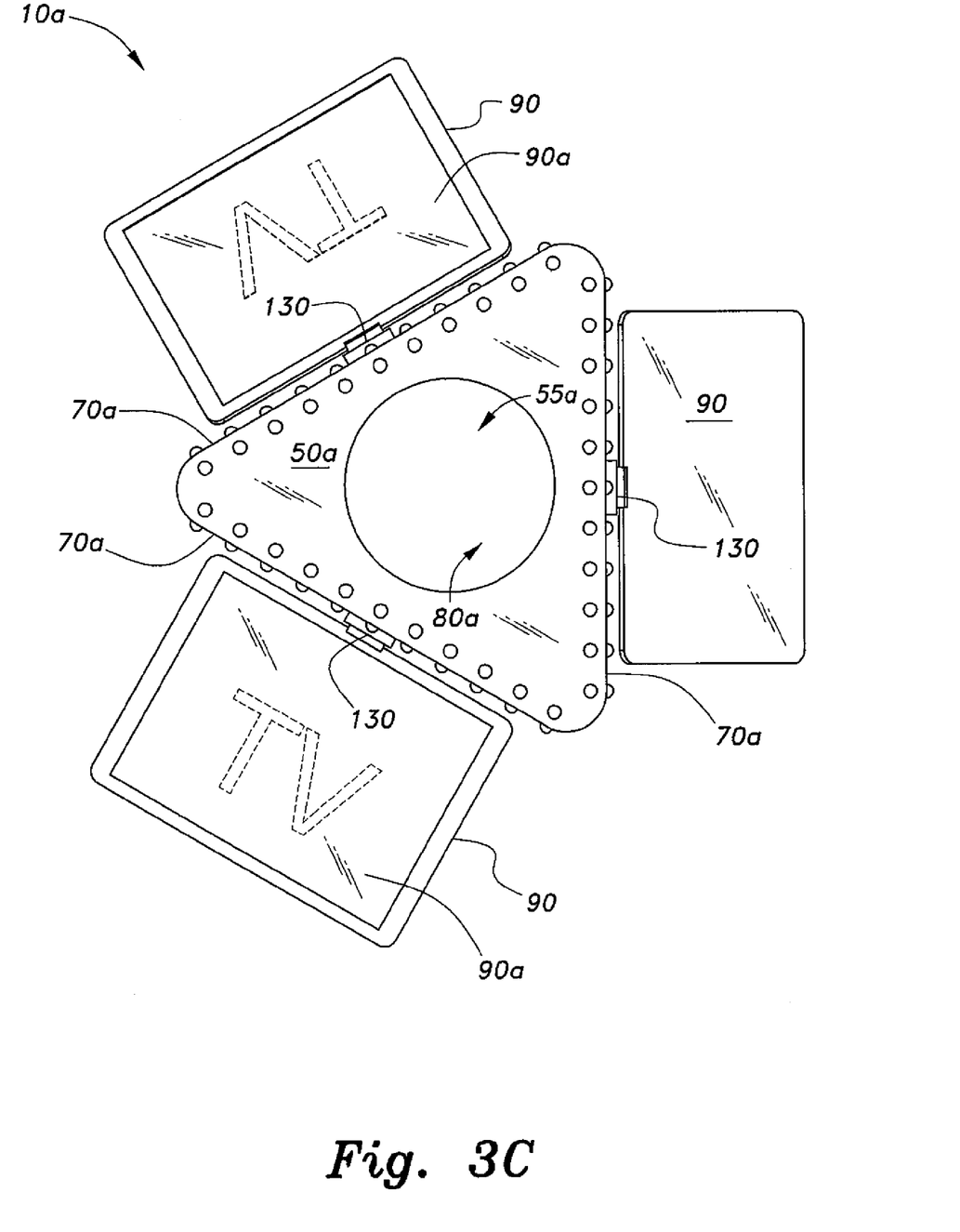
FIG. 3C is a top view of another embodiment of a video monitor attachment for a microphone including a plurality of selectively moveable monitors according to the present invention.
Figure 6:
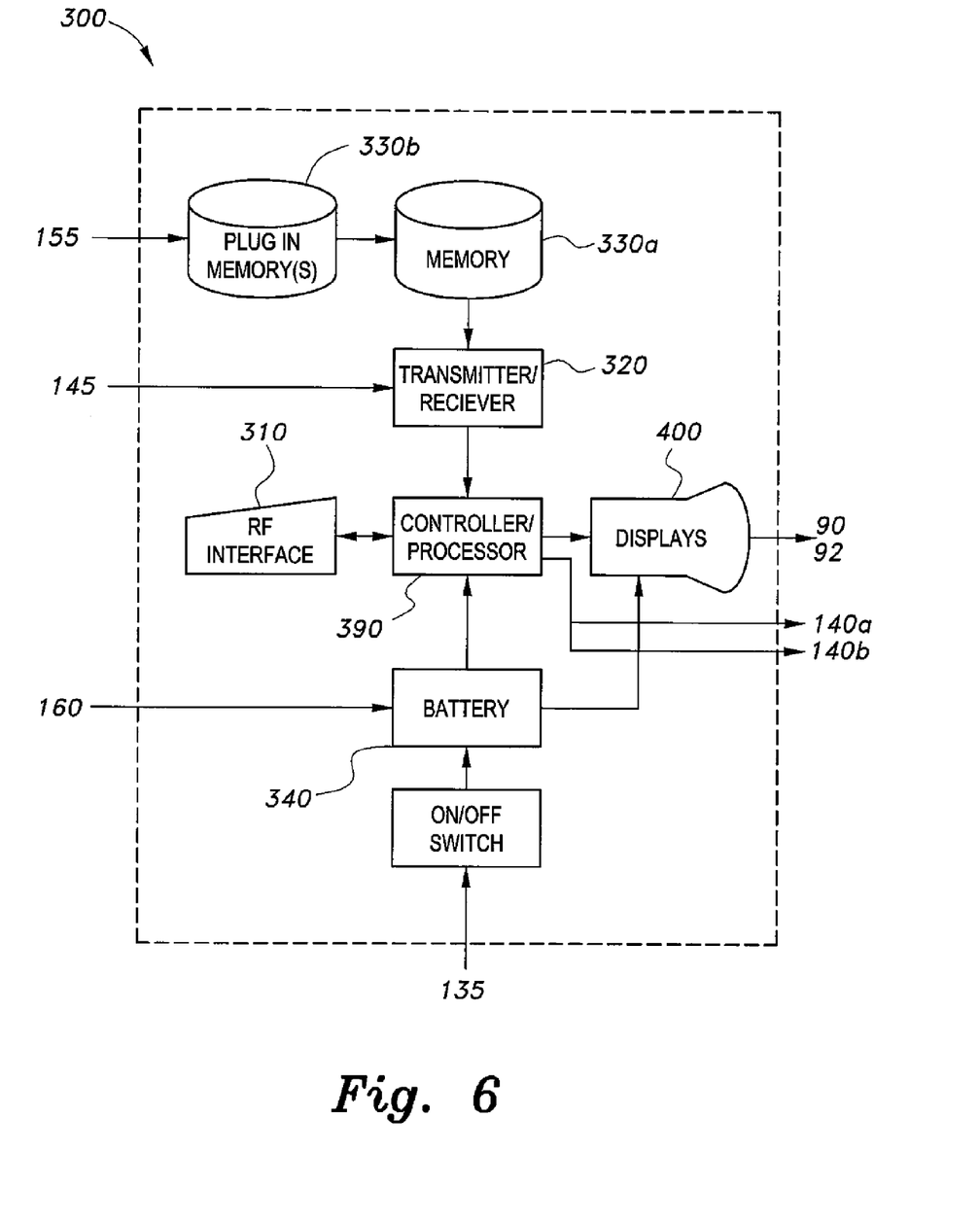
FIG. 6 is a diagram of a generalized control system of a control device or control unit for use with embodiments of a video monitor attachment for a microphone according to the present invention.

Referring to FIGS. 2B and 6, the video monitor attachment, such as the video monitor attachments 10, 10a, and 10b, can be configured to include an "on/off" switch 135 to selectively activate the video monitor attachment, such as video monitor attachments 10, 10a, and 10b. The "on/off" switch 135 can be positioned on the bottom portion 60, 60a of the video monitor attachment, such as the video monitor attachments 10, 10a, and 10b, as illustrated in FIG. 2B, for example. Further, the video monitor attachment, such as the video monitor attachments 10, 10a, and 10b, can be configured to include a control unit 150 having a control system 300 for implementing embodiments of the video monitor attachment, such as the video monitor attachments 10, 10a, and 10b including to control operation of the at least one selectively moveable monitor 90 and the at least one selectively movable first monitor 92. It is to be noted that the control unit 150 can be positioned in the interior portion 110, 110a of the video monitor attachment, such as the video monitor attachments 10, 10a, and 10b. It should be understood that a controller/processor 390 of the control system 300 can represent or be implemented by a microcontroller, an application specific integrated circuit (ASIC), or a programmable logic controller (PLC), for example.

Data can be entered into the control system 300 by the user, or sent or received from or by any suitable type of interface 310, such as a radio frequency (RF) interface as can be associated with the controller/processor 390, such as for wireless transmission/reception or for wireless communication. Components of the control system 300 can include a memory 330a, such as to store data and information, as well as programs(s) or instructions for implementing by the controller/processor 390 operation of the at least one selectively moveable monitor 90 and the at least one selectively moveable first monitor 92 that are in communication with the controller/processor 390 by a wired or wireless communication, for example. It is to be noted that the memory 330a can be any suitable type of computer readable and programmable memory, such as non-transitory computer readable media, random access memory (RAM), or read only memory (ROM), for example, and should not be construed in a limiting sense.

It is to be understood that the video monitor attachment, such as the video monitor attachments 10, 10a, and 10b, can also be configured to include outlets for a plug-in memory 330b, such as a universal serial bus (USB) outlet adapted to receive a USB memory device storing media to be presented on a display 400, such as on the display screen 90a of the at least one selectively moveable monitor 90 and on the display screen 92a of the at least one selectively moveable first monitor 92, as well as can include at least one and, desirably, a plurality of memory slots, such as memory slots 155a, 155b, 155c, and 155d adapted to receive the external plug-in memory 330b containing multimedia, such as videos or logos, for example. It is to be noted that the plug-in memory 330b can be configured to communicate with the memory 330a of the control system 300.

The control system 300 can also be powered by a power source 340, such as a rechargeable 12 volt battery, for example. It is to be known that the display 400, such as the display screen 90a of the at least one selectively moveable monitor 90 and the display screen 92a of the at least one selectively moveable first monitor 92, can be in electrical communication with the power source 340 so as to powered by the power source 340, for example. The bottom portion 60, 60a of the video monitor attachment, such as video monitor attachments 10, 10a, and 10b, can also include a power outlet 160 adapted to receive a power cable so as to recharge the power source 340.

It is also contemplated that the power source 340 can be replaced when the power source 340 can no longer power the display 400, such as the display screen 90a of the at least one selectively moveable monitor 90 and the at least one display screen 92a of the selectively moveable first monitor 92. The video monitor attachment, such as the video monitor attachments 10, 10a, and 10b, can be adapted to include at least one and, desirably, a plurality of indicator lights, such as a red indicator light 140a to indicate that the power source 340 needs to be recharged and a green indicator light 140b to indicate that the power source 340 is charged and/or the video monitor attachment, such as the video monitor attachments 10, 10a, and 10b, is ready for use, for example.

Data transmission or data reception, and sending or receiving images or commands, such as in relation to what is presented on the display 400, such as on the display screen 90a of the at least one selectively moveable monitor 90 and on the display screen 92a of the at least one selectively moveable first monitor 92, are performed or executed by the controller/processor 390 of the control system 300 of the control unit 150. The controller/processor 390 can be any of various suitable types of computer processors, such as a microprocessor or an ASIC, and the data transmission or data reception, and the sending or receiving of control signals or commands, processed or controlled by the controller/processor 390, can be displayed to the user or one or more viewers, such as an audience, on the display 400, such as on the display screen 90a of the at least one selectively moveable monitor 90 and on the display screen 92a of the at least one selectively moveable first monitor 92, which can be any suitable type of display, such as a light emitting diode (LED) display, a liquid crystal display (LCD) or other suitable type of display, for example.

The controller/processor 390 can be associated with, or incorporated into any suitable type of computing device, such as a personal computer or a PLC, for example. The display 400, the controller/processor 390, a transmitter/receiver 320 to send and receive data and information, the memory 330a, the plug-in memory 330b, and any associated computer readable media are in communication with one another by any suitable type of data bus, as is well known in the art.

By way of operation, as the handle 30 of the microphone 20 is inserted through the first opening 55, 55a of the top portion 50, 50a, through the channel 80, 80a and through the second opening 65, 65a of the bottom portion 60, 60a of the video monitor attachment, such as the video monitor attachments 10, 10a, and 10b, the at least one or more biasing members 100 of each of the respective self-adjusting gripping assemblies 95, 95a adapted to secure the handle 30 of the microphone 20 within the video monitor attachment, such as the video monitor attachments 10, 10a, and 10b, begin to compress to allow the handle 30 of the microphone 20 to pass through the channel 80, 80a and substantially secure the handle 30 within the video monitor attachment, such as the video monitor attachments 10, 10a, and 10b.

Also, once the video monitor attachment, such as the video monitor attachments 10, 10a, and 10b, is positioned in engaging relation with the handle 30 of the microphone 20, the friction enhancing material 107 on each gripping member 105, 105a, 105b can assist in preventing the video monitor attachment, such as the video monitor attachments 10, 10a, and 10b, from substantially moving while the microphone 20 is being used, for example. The on/off switch 135 on the video monitor attachment, such as the video monitor attachments 10, 10a, and 10b, can then be switched to the "on" position to activate the control system 300 and the at least one selectively moveable monitor 90, as well as to activate the at least one selectively moveable first monitor 92, if included on the video monitor attachment.

Further, once the video monitor attachment, such as video monitor attachments 10, 10a, and 10b, is turned "on" the media stored on the memory 330a or in the plug-in memory 330b, such as advertising, videos, logos, and brand names, etc. is transferred to and presented on the display 400, such as on the display screen 90a of the at least one selectively moveable monitor 90 and/or on the display screen 92a of the at least one selectively moveable first monitor 92, if included on the video monitor attachment. The at least one selectively moveable monitor 90 and/or the at least one selectively moveable first monitor 92 can then be selectively positioned at any of various suitable positions, as described, such as at a respective suitable angle A or at a respective suitable angle A1 or can also be rotated at a respective suitable angle R to face a suitable direction so that the corresponding display screen, such as the display screen 90a and/or the display screen 92a, can face the audience and/or a user of the video monitor attachment, such as illustrated in FIGS. 5A and 5B, for example.

It is to be understood that the present invention is not limited to the embodiments described above, but encompasses any and all embodiments within the scope of the following claims.

I claim:

1. A video monitor attachment for a microphone, comprising: a top portion having a first opening, a bottom portion having a second opening, and a plurality of sides communicating with the top portion and the bottom portion, the first opening and the second opening communicating with a channel formed within the video monitor attachment adapted to receive a handle of a microphone; at least one selectively moveable monitor having a display screen and being movably mounted on a coupling member positioned on a corresponding side of the plurality of sides, the at least one selectively moveable monitor being adapted to display images on the display screen when the microphone is positioned in the video monitor attachment; and a plurality of self-adjusting gripping assemblies located in an interior portion of the video monitor attachment, the plurality of self-adjusting gripping assemblies being equidistantly distributed about the interior portion of the video monitor attachment, the plurality of self-adjusting gripping assemblies adapted to engage the handle of the microphone when the handle of the microphone is inserted through the first opening, the channel and the second opening so as to position the handle in engaging relation with the video monitor attachment, wherein, when the handle of the microphone is positioned in engaging relation with the video monitor attachment, the at least one selectively moveable monitor is adapted to be selectively rotated and positioned so as to display images.

2. The video monitor attachment for a microphone according to claim 1, wherein the coupling member comprises a hinge to allow the at least one selectively moveable monitor to rotate about at least one axis.

3. The video monitor attachment for a microphone according to claim 1, wherein the coupling member comprises a ball joint to allow the at least one selectively moveable monitor to rotate about at least two axes.

4. The video monitor attachment for a microphone according to claim 1, wherein
the at least one selectively moveable monitor comprises a plurality of selectively moveable monitors, and
each of the plurality of selectively moveable monitors is adapted to be selectively rotated and positioned so as to display images.

5. The video monitor attachment for a microphone according to claim 1, wherein the at least one selectively moveable monitor is coupled to a selectively moveable first monitor.

6. The video monitor attachment for a microphone according to claim 1, wherein each self-adjusting gripping assembly of the plurality of self-adjusting gripping assemblies comprises at least one biasing member and a gripping member coupled to a corresponding at least one biasing member.

7. The video monitor attachment for a microphone according to claim 6, wherein the gripping member comprises a friction enhancing material to engage the handle of the microphone to substantially secure the microphone in the video monitor attachment.

8. The video monitor attachment for a microphone according to claim 1, further comprising:
a control system to control operation of the at least one selectively moveable monitor.

9. A video monitor attachment for a microphone, comprising: a top portion having a first opening, a bottom portion having a second opening, and a plurality of sides communicating with the top portion and the bottom portion, the first opening and the second opening communicating with a channel formed within the video monitor attachment adapted to receive a handle of a microphone; at least one selectively moveable monitor having a display screen movably mounted on a coupling member positioned on a corresponding side of the plurality of sides; at least one selectively moveable first monitor having a display screen, at least one said selectively moveable monitor being coupled by a second coupling member to a corresponding selectively moveable first monitor, the at least one selectively moveable monitor and the at least one selectively moveable first monitor being adapted to display images when the microphone is positioned in the video monitor attachment; and a plurality of self-adjusting gripping assemblies located in an interior portion of the video monitor attachment, each of the plurality of self-adjusting gripping assemblies being configured to include at least one biasing member and a gripping member coupled to a corresponding at least one biasing member, the plurality of self-adjusting gripping assemblies being equidistantly distributed about the interior portion of the video monitor attachment, the plurality of self-adjusting gripping assemblies adapted to engage the handle of the microphone when the handle of the microphone is inserted through the first opening, the channel and the second opening so as to position the handle in engaging relation with the video monitor attachment, wherein, when the handle of the microphone is positioned in engaging relation with the video monitor attachment, the at least one selectively moveable monitor and the at least one selectively moveable first monitor are adapted to be selectively rotated and positioned so as to display images.

10. The video monitor attachment for a microphone according to claim 9, wherein the coupling member and the second coupling member respectively allow the at least one selectively moveable monitor and a corresponding at least one selectively moveable first monitor to respectively rotate about at least one axis.

11. The video monitor attachment for a microphone according to claim 9, wherein the coupling member and the second coupling member respectively allow the at least one selectively moveable monitor and a corresponding at least one selectively moveable first monitor to respectively rotate about at least two axes.

12. The video monitor attachment for a microphone according to claim 9, wherein the at least one selectively moveable monitor comprises a plurality of selectively moveable monitors.

13. The video monitor attachment for a microphone according to claim 9, further comprising:
a power source to provide power to the at least one selectively moveable monitor and to the at least one selectively movable first monitor.

14. The video monitor attachment for a microphone according to claim 9, further comprising:
a control system to control operation of the at least one selectively moveable monitor and the at least one selectively movable first monitor.

15. In combination with a microphone, a video monitor attachment, comprising: a top portion having a first opening, a bottom portion having a second opening, and a plurality of sides communicating with the top portion and the bottom portion, the first opening and the second opening communicating with a channel formed within the video monitor attachment adapted to receive a handle of a microphone; at least one selectively moveable monitor having a display screen and being movably mounted on a corresponding side of the plurality of sides, the at least one selectively moveable monitor being adapted to display images on the display screen when the microphone is in use; and a plurality of self-adjusting gripping assemblies located in an interior portion of the video monitor attachment, the plurality of self-adjusting gripping assemblies being equidistantly distributed about the interior portion of the video monitor attachment, the plurality of self-adjusting gripping assemblies adapted to engage the handle of the microphone when positioned in the channel, wherein, when the handle of the microphone is positioned in engaging relation with the video monitor attachment, the at least one selectively moveable monitor is adapted to be selectively rotated and positioned so as to display images to an audience when the microphone is being used.

16. In combination with a microphone, a video monitor attachment according to claim 15, further comprising:
a coupling member to allow the at least one selectively moveable monitor to rotate about at least one axis.

17. In combination with a microphone, a video monitor attachment according to claim 16, wherein the coupling member comprises a ball joint to allow the at least one selectively moveable monitor to rotate about at least two axes.

18. In combination with a microphone, a video monitor attachment according to claim 15, wherein the at least one selectively moveable monitor comprises a plurality of selectively moveable monitors.

19. In combination with a microphone, a video monitor attachment according to claim 15, further comprising:
   a control system to control operation of the at least one selectively moveable monitor.

20. In combination with a microphone, a video monitor attachment according to claim 15, wherein at least one said selectively moveable monitor is coupled to a selectively moveable first monitor.

* * * * *